United States Patent [19]

Okumura et al.

[11] Patent Number: 5,293,250
[45] Date of Patent: Mar. 8, 1994

[54] A SYSTEM FOR NOTIFYING A DESTINATION TERMINAL THAT ELECTRONIC MAIL HAS REACHED A HOST COMPUTER

[75] Inventors: Shigemi Okumura, Kiyose; Toshio Hirosawa, Machida, both of Japan

[73] Assignee: Hitachi, Ltd., Tokyo, Japan

[21] Appl. No.: 850,969

[22] Filed: Mar. 11, 1992

[30] Foreign Application Priority Data

Mar. 14, 1991 [JP] Japan .................................. 3-049319

[51] Int. Cl.$^5$ .............................................. H04N 1/00
[52] U.S. Cl. .................................... 358/402; 358/407
[58] Field of Search ............... 358/402, 403, 404, 437, 358/444; 379/100; H04N 1/00

[56] References Cited
U.S. PATENT DOCUMENTS

| | | | |
|---|---|---|---|
| 4,849,816 | 7/1989 | Yoshida | 358/434 |
| 4,956,860 | 9/1990 | Murata | 358/440 |
| 5,084,769 | 1/1992 | Miura | 358/403 |

FOREIGN PATENT DOCUMENTS 62-268253 11/1987 Japan .
2-311047 12/1990 Japan .

OTHER PUBLICATIONS

Hitachi Software Engineering, Ltd., SK-BB S2 Manuals No. Co 848-004-01 published in Jul., 1989.

*Primary Examiner*—Edward L. Coles, Sr.
*Assistant Examiner*—Kim Yen Vu
*Attorney, Agent, or Firm*—Fay, Sharpe, Beall, Fagan, Minnich & McKee

[57] ABSTRACT

A mail-receive noticing system and method and provided for automatically notifying a destination terminal of a fact that an electronic mail reaches a host computer. A mail-sending terminal includes a mail-receiving notice instructing device for accepting a mail-receiving notice instruction of a sender on the sending terminal given depending upon urgency or importance level of the mail and an information sending device for sending mail-receiving notice instructing information generated based on the accepted mail-receiving notice instruction, together with a sending signal of an electronic mail to a host computer. The host computer includes a device for receiving the mail-receiving notice instructing information from a sending terminal and processing devices for generating a mail-receiving notice indication based on the received mail-receiving notice instructing information and sending the same to a receiving terminal. The destination terminal includes a mail-receive noticing device actuated by the received mail-receiving notice indication for noticing that an electronic mail reaches the host computer to a user in an informing fashion different along urgency or importance level of the mail instructed by the sender.

10 Claims, 8 Drawing Sheets

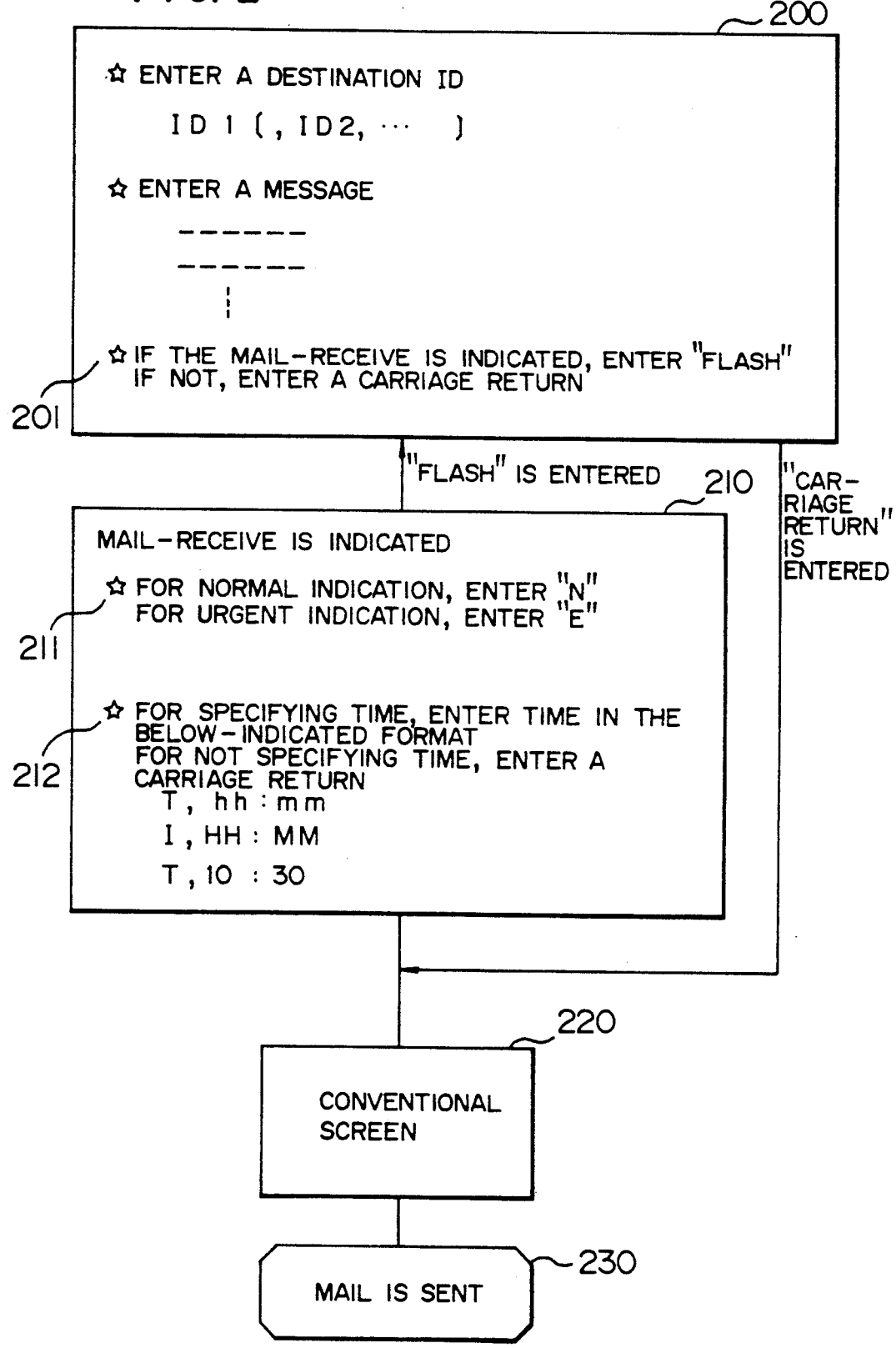

FIG. 3

$$\text{mail} \triangle \underbrace{id1}_{240} \underbrace{[, id2, -----]}_{250} \underbrace{\left[, \left\{ \begin{matrix} N \\ E \end{matrix} \right\} \right]}_{260} \underbrace{\left[, \left\{ \begin{matrix} T, hh:mm \\ I, HH:MM \end{matrix} \right\} \right]}_{270}$$

mail ------ MAIL-SENDING COMMAND IDENTIFIER id1, id2, ----- DESTINATION ID

N, E ------ MAIL-RECEIVING TYPE
        N ; NORMAL INDICATION
        E ; URGENT INDICATION

T, hh:mm ----- SPECIFYING A TIME
I, HH:MM
        T ; ENTER A TIME
        I ; ENTER A TIME LENGTH
        hh:mm ; TIME (HOUR:MINUTE)
        HH:MM ; TIME LENGTH (HOUR:MINUTE)

FIG. 4

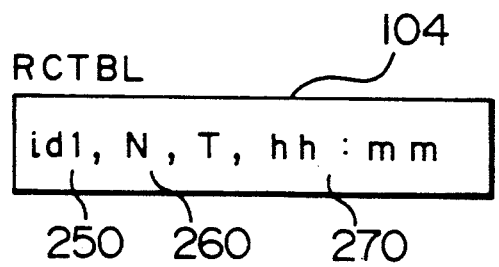

FIG. 7

RMTBL 101A

| TELEPHONE NUMBER | MAIL-RECEIVING TYPE | SPARED (EXPANDED) |
|---|---|---|
| TEL No | N/E | |

RMTBL 101B
NUMBER OF REGISTERED ENTRIES (N) — 5, 5A

| TELEPHONE NUMBER | MAIL-RECEIVING TYPE | MAIL-RECEIVING TIME | SPARED (EXPANDED) DATA |
|---|---|---|---|
| TEL No 1 | N | hh:mm | |
| TEL No 2 | E | hh:mm | |
| ≈ | ≈ | ≈ | ≈ |
| TEL Non | N | hh:mm | |

A SYSTEM FOR NOTIFYING A DESTINATION TERMINAL THAT ELECTRONIC MAIL HAS REACHED A HOST COMPUTER

BACKGROUND OF THE INVENTION

The present invention relates to an electronic mailing system and more particularly to the electronic mailing system which has a function of notifying a destination terminal of a fact that an electronic mail reaches a host computer.

The electronic mailing system includes a plurality of terminals which are connected to a host computer through a public telephone network or a local area network (LAN). When any connected terminal sends to the host computer an electronic mail having another terminal specified as its destination, the host computer stores the electronic mail in its own mail box. When a subscriber in the electronic mailing system has access to the host computer, the host computer sends to the subscriber's terminal a message indicating that the electronic mail is stored. In response to the message, the subscriber terminal can receive the electronic mail along a predetermined procedure.

Such an electronic mailing system has been disclosed in "Hitachi Software Engineering Ltd., ed., SK-BBS2 Manuals No.C0848-004-01, published in July, 1989", for example.

The conventional electronic mailing system is designed so that a user or subscriber on a destination terminal may not know if an electronic mail is sent to the terminal itself until the user on the destination terminal has access to the host computer. Hence, a disadvantage may take place that the terminal cannot receive the electronic mail at a proper time. To avoid the disadvantageous situation, a user on a terminal is required to periodically have access to the host computer or a user on a sending terminal has to phone to a user on a destination terminal for notifying of sending of an electronic mail or making sure that the mail is received. Such a troublesome and intricated procedure becomes necessary to sending or receiving an electronic mail. This is another disadvantage.

To overcome these disadvantages, the following two proposals have been made.

One proposal is JP-A-62-268253, which discloses a system for notifying of the receipt of an electronic mail. In this system, the electronic mailing module, that is, the host computer includes a memory having a function of displaying an electronic mail left therein. The host computer automatically retrieves the memory for a certain amount of time and notifies the destination terminal of the mail being left therein. The other proposal is JP-A-2-311047, which discloses a mailing system between the facsimile international standardization G4 terminals. This system is based on a message handling system (MHS) routine. In the mailing system, a sending terminal sends to the host computer a control document accompanied with receiver-identifying information and the host computer notifies the receiving terminal of the receipt of the electronic mail by referring to the receiver-identifying information. This notification is effected through a public phone by a computer voice. Both of the prior art systems do not allow a sending terminal to selectively specify a mail-receive noticing method such as an urgency level or a receipt time and send the specified terminal to a receiving terminal. The former proposal of JP-A-62-268253 provides only a means for notifying a receiving terminal of the fact that an electronic mail reaches the host computer. Hence, the user has no means to make sure of how important the content of the mail is and how urgently it is noticed except checking the content of the mail box. The latter proposal of JP-A-2-311047 provides a mail-received location uniquely defined as a facsimile. It means that the message-received location is uniquely defined as a telephone. Hence, no user can know the receipt of the mail on his terminal.

SUMMARY OF THE INVENTION

It is an object of the present invention to provide an electronic mailing method and system which are capable of automatically notifying a destination terminal of the fact that an electronic mail reaches a host computer, in sender's desired informing fashion mail.

It is another object of the present invention to provide a method and a system for acknowledging receipt of an electronic mail which allow the sending terminal to make sure whether the electronic mail reaches a host computer, consequently a destination terminal without needing access to the host computer.

According to an aspect of the invention, an electronic mailing system includes a host computer and a plurality of terminals connected to the host computer through a communication line, in which one of the terminals sends an electronic mail, the host computer stores the electronic mail sent from the sending terminal and a receiving or destination one of the terminals reads the electronic mail from the host computer. The sending terminal includes means for accepting a request for designating a mail-receiving notice, the designation being determined depending upon the level of urgency or importance of the mail to be sent, and sending means for sending to the host computer the electronic mail accompanied by mail-receiving notice designating information generated based on accepted designation of mail-receiving notice. The host computer includes means for receiving and processing the mail-receiving notice designating information from the sending terminal and means for sending mail-receiving notice information generated based on the received notice designating information, from the host computer itself to the receiving terminal. The destination terminal includes means for receiving the mail-receiving notice information from the host computer and means for positively notifying a user on the destination terminal of the fact that the electronic mail reaches the host computer, based on the mail-receiving notice information.

The operation of the electronic mailing system arranged as above will be briefly described.

When a user on the sending terminal requests designation of a mail-receiving notice, the sending terminal accepts the request at the request receiving means and passes it to the sending means. The means for sending the mail-receiving notice designating information serves to generate mail-receiving notice information based on designation of the mail-receiving notice and send to the host computer the electronic mail accompanied with the generated mail-receiving notice designating information. The host computer receives the mail-receiving notice designating information at the receiving and processing means and passes it to the means for sending the mail-receiving notice information of the host computer. The sending means of the host computer serves to generate mail-receiving notice information based on the mail-receiving notice designating information and send it to the destination terminal. The destination terminal serves to receive the mail-receiving notice information from the host computer at its receiving means. The receiving means serves to analyze the mail-receiving notice information and notify a user on the destination terminal of the fact that the electronic mail reaches the host computer by means of such as a print-out material or a beep sound.

The mail-receive noticing system allows the user on the destination terminal to know that the electronic mail reaches the host computer to thereby read it on at a proper time.

BRIEF DESCRIPTION OF THE DRAWINGS

FIG. 2 is an illustration showing a screen on which a user on a sending terminal specifies a mail-receiving instruction in an interactive manner;

FIG. 3 is a format diagram showing a command given when a user on a sending terminal specifies a mail-receiving indication in a command manner;

FIG. 4 is a diagram showing a format of RCTBL;

FIG. 7 is a diagram showing a format of RMTBL;

DESCRIPTION OF THE PREFERRED EMBODIMENTS

Herein, the present invention will be described in more detail along the embodiments shown with reference to the accompanying drawings. It goes without saying that this embodiment does not limit the present invention.

Figure 1:
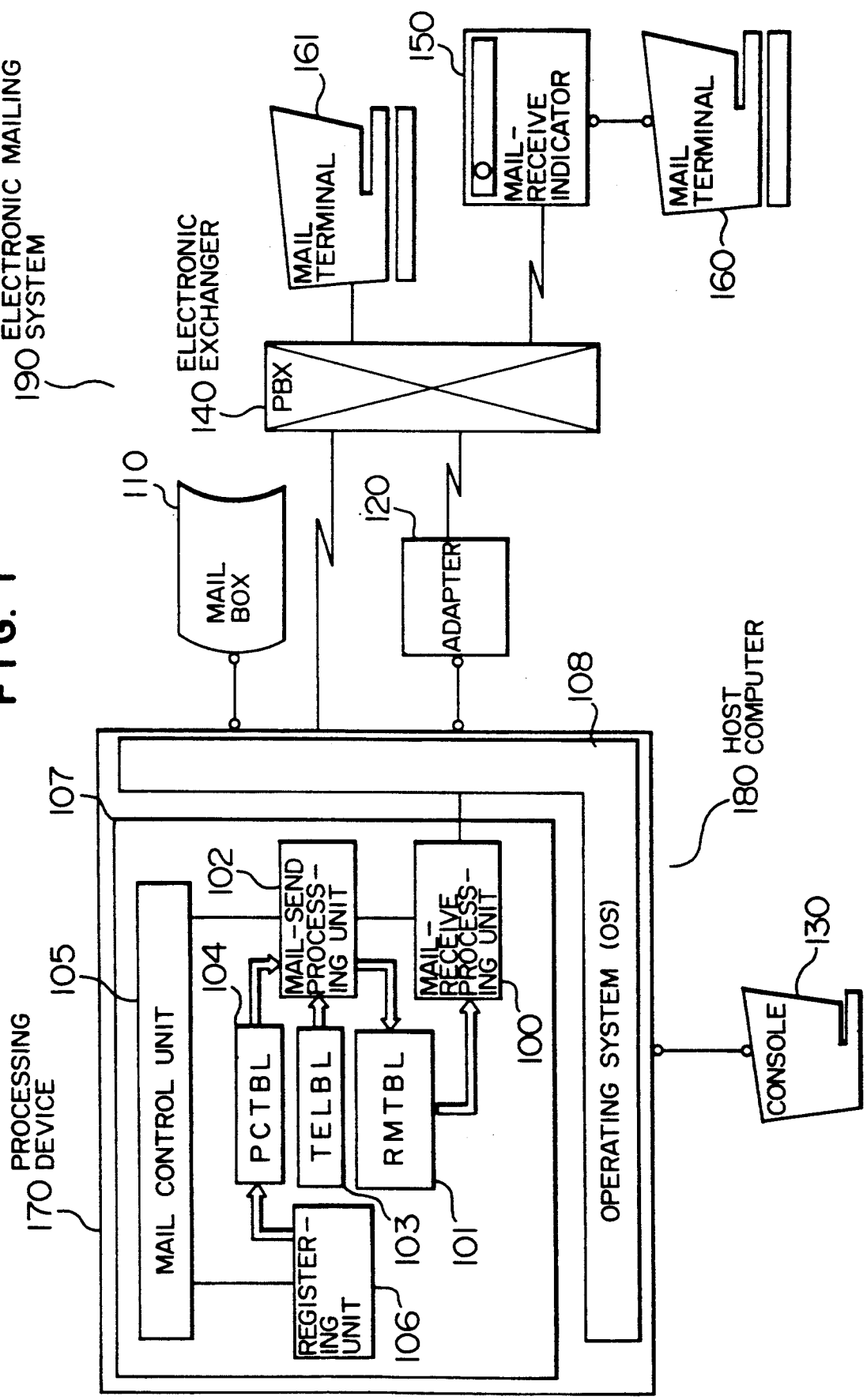
FIG. 1 is a diagram showing an electronic mailing system according to an embodiment of the present invention.

FIG. 1 shows an electronic mailing system 190 according to an embodiment of the present invention. The electronic mailing system 190 includes a host computer 180 and a plurality of mail terminals 160, 161 connected therebetween through an electronic exchanger 140. The host computer 180 provides a processing device 170, a console 130, a mail box 110 and an adapter 120 for searching a function (to be described later).

The processing device 170 has an electronic mail control program unit 107 which is operated under the control of an operating system 108. The control program unit 107 is configured to include a mail control unit 105, a registering unit 106, a receive table (RCTBL) 104, a telephone table (TELTBL) 103, a mail-send processing unit 102, a registered mail table (RMTBL) 101, and a mail-receive processing unit 100.

The mail terminal 160 provides a mail-receive indicator 150 such as an LED lamp or LCD.

When a user starts a communication program on his/her mail terminal 161, a screen 200 shown in FIG. 2 appears on the mail-receive indicator 150. The user enters a destination ID and a message according to an indication appearing on the screen 200.

In response to the entry, the communication program provided in the mail terminal 160 gives a question 201 of asking if the mail-receive is indicated. If he or she wants it, the user enters "flash" and if he or she does not want it, the user enters a carriage return.

When "flash" is entered, the screen 210 shown in FIG. 2 is displayed. On the screen 210, a question 211 is given of asking about a mail-receiving type. The user enters "N (normal)" if he or she wants a normal indication or "E (emergency)" if he or she wants an emergent indication.

Then, a question 211 is given of asking if a mail-receive indicating time is specified. If he or she wants to specify the time, the user enters the time data according to the illustrative format. If he or she does not want, the user enters a carriage return.

If the mail-receive indicating time is entered, the time-specifying format is {T, hh:mm}, where T is a time, hh is a hour and mm is a minute. If the time between the current time and the mail-receive indicating time is entered, the format is {I, HH:MM}, wherein I is an interval, HH is a hour and MM is a minute. If the data of {I, HH:MM} format is entered, the communication program serves to convert the data into the data of a real-time {T, hh:mm} format. It means that the time-specifying data format is integrated as {T, hh:mm}.

When the entry for the question or inquiry 212 is over or the carriage return is entered for the question 211, the conventional screen 220 appears. The user performs some routine operations such as selecting a telephone number for doing the communication from the terminal to the host computer 180.

When the user terminates the necessary interactions on the screen 220, the communication program serves to send an electronic mail to the host computer 180 in accordance with a predetermined protocol used in a publicly known mailing system. At this time, information for designating mail-receiving indication is sent together with the electronic mail itself.

The function of specifying the time by the communication program can be realized like a reserved sending function contained in a facsimile communication protocol. In place of or in addition to the interactive entry system as mentioned above, it is possible to employ a command entry system shown in FIG. 3.

When the host computer 180 receives an electronic mail from the mail terminal 161, the mail control unit 105 starts registering unit 106. The registering unit 106 serves to register a message in the mail box 110, based on the destination ID. If the information about the mail-receiving indication is contained in the mail, the registering unit 106 creates the RCTBL 104 and passes it to the mail-send processing unit 102.

The RCTBL 104 is configured to have an user ID 250, a mail-receiving type 260, and a specified time 270 as shown in FIG. 4. The mail-send processing unit 102 serves to retrieve the TELTBL 103 built in the host computer or saved in an external database with a key of a destination ID 250 of the RCTBL 104 passed from the registering unit 106 as shown in a step 610 of FIG. 5.

Figure 6:
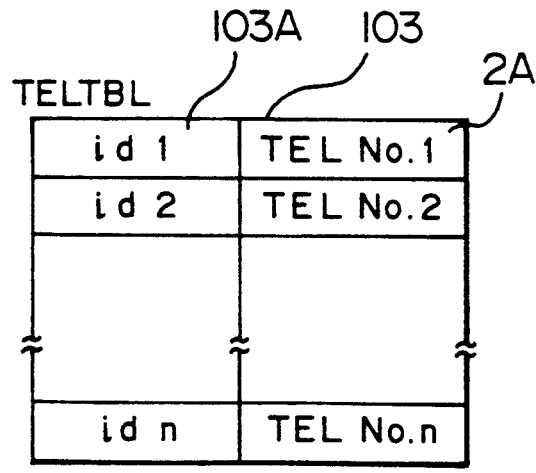
FIG. 6 is a diagram showing a format of TELTBL.

The TELTBL 103 is a corresponding table between the user ID 103A and the phone number 2A as shown in FIG. 6.

Figure 5:
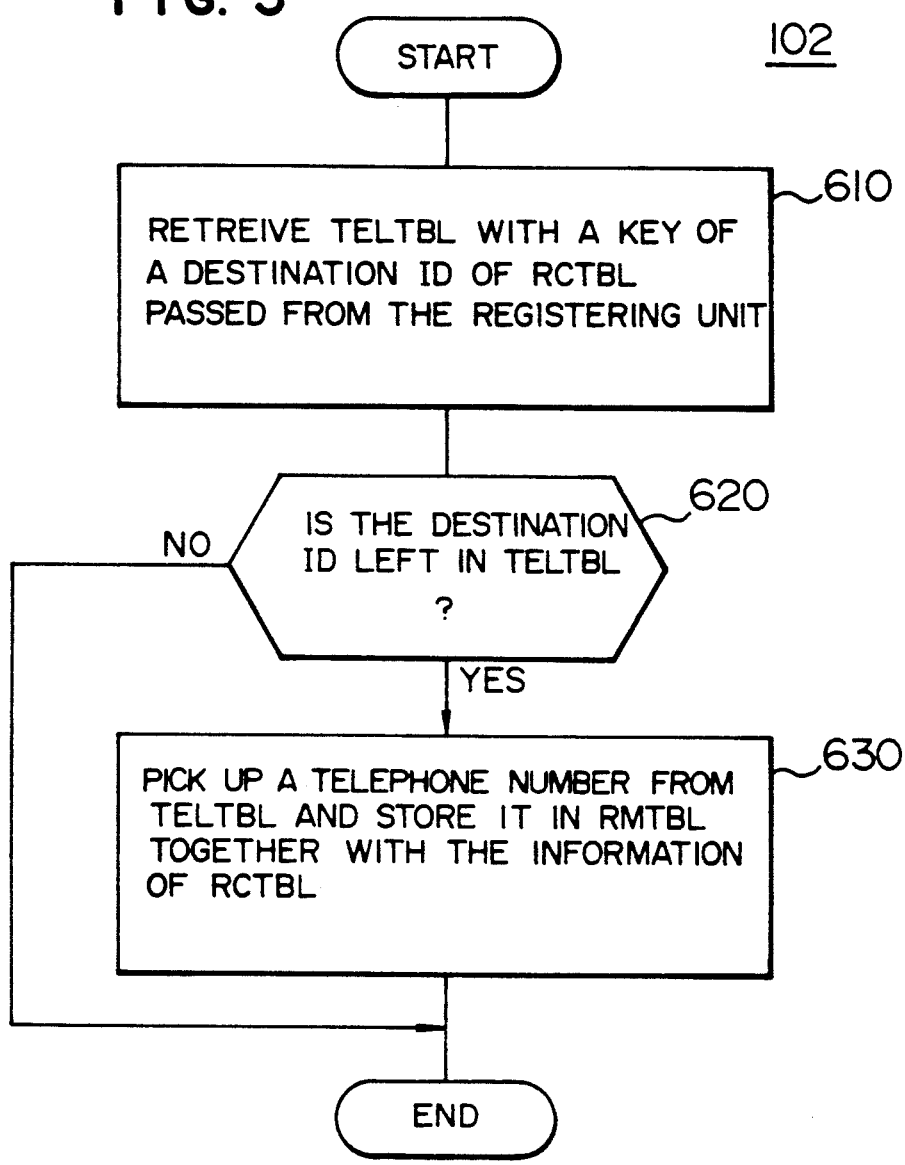
FIG. 5 is a flowchart showing an operation of a mail-send processing unit shown in FIG. 1.

At the step 620 shown in FIG. 5, it is determined whether or not the destination ID 250 is located in the TELTBL 103. If the destination ID 250 is located in the TELTBL 103, at the step 630, the telephone number 2A is picked up and is stored in the RMTBL 101 together with the information of the RCTBL 104.

The RMTBL 101 has two formats as shown in FIG. 7. One format is the RMTBL 101A with no specified time. The other format is the RMTBL 101B with a specified time. The RMTBL 101A is configured to have a telephone number 2, a mail-receiving type 3 indicating an urgent level of the mail, and a spared (expanded) data such as a notice message.

The RMTBL 101B is configured to have a field of a number of registered entries 5, a telephone number 2, a mail-receiving type 3, a mail-receive indicating time 6, and a spared (expanded) data 4. Since it is necessary to reserve the data until the mail-receive indicating time, two or more entries are allowed to be registered. The number of currently registered entries is stored in the field 5.

The determining process 620 shown in FIG. 5 terminates the process without creating the RMTBL 101 if the destination ID 250 is not contained in the TELTBL 103. In this case, therefore, no mail-receiving notice is carried out.

Figure 8:
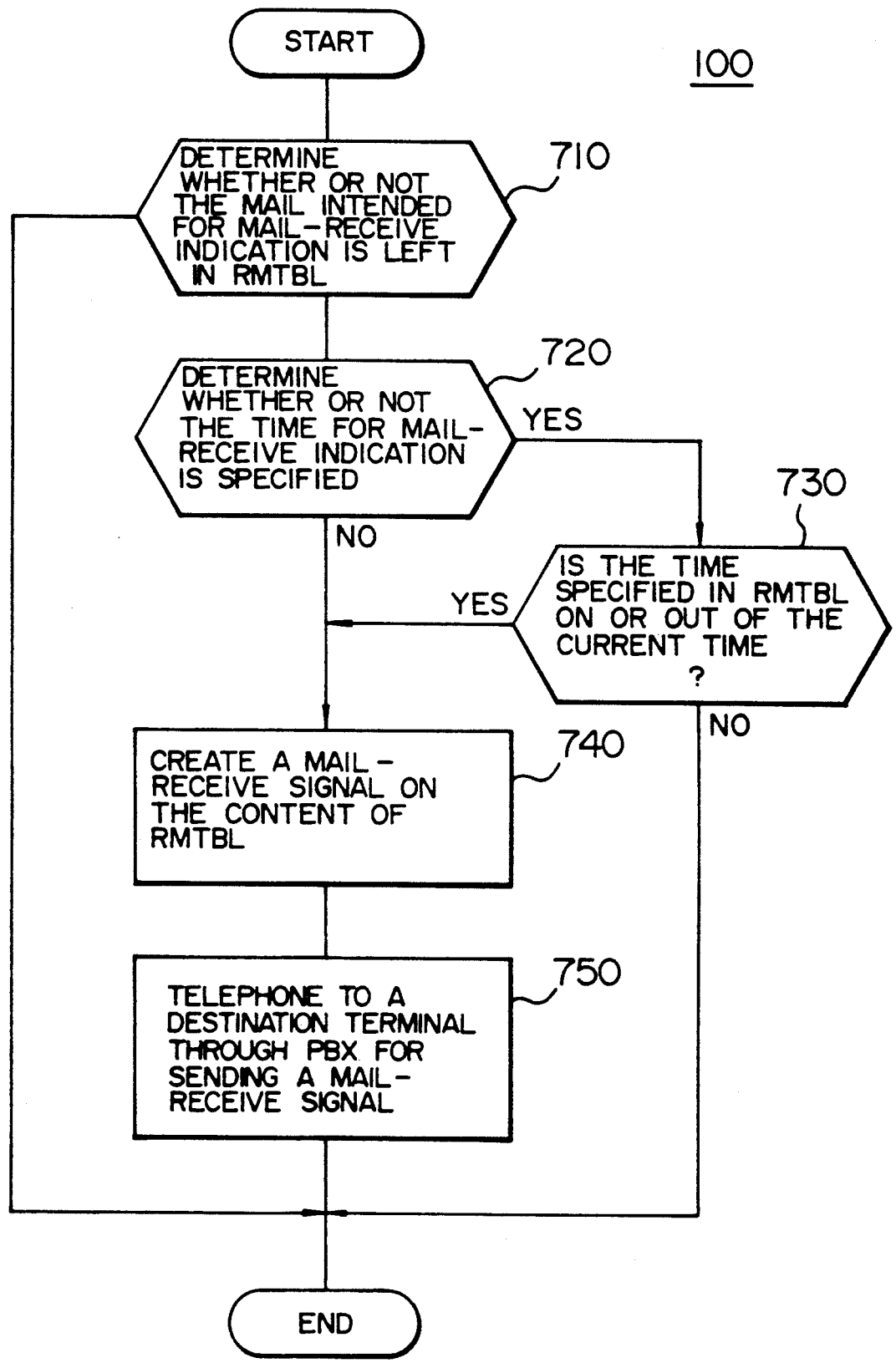
FIG. 8 is a flowchart showing an operation of a mail-receive processing unit shown in FIG. 1.

The mail-receive processing unit 100 refers to the RMTBL 101 and determines whether or not the mail registered in the RMTBL 101 is left. If not, the process is terminated. If left, the process goes to a step 720 shown in FIG. 8.

At the step 720, if the format of RMTBL 101 is RMTBL 101A, the process goes to a step 740. If the format of RMTBL 101 is RMTBL 101B, the process goes to a step 730.

At the step 730, it is determined if the mail-receive indicating time contained in the RMTBL 101B is on or out of the current time. If it is on the current time, the process goes to a step 740 and if it is out of the current time, the process is terminated (the mail-receiving indication enters into a waiting state).

At the step 740, the mail-receive signal is created on the content of the RMTBL 101.

At the step 750, the mail control unit 107 serves to telephone to the destination mail terminal 160 through the electronic exchanger 140 based on the content of the RMTBL 101. In this operation, the adapter 120 performs dialing and sends the mail-receive indication signal to the destination mail terminal 160.

The processes (FIG. 8) in the mail-receive processing unit 100 are executed when an electronic mail is received. The processes may be executed at each certain interval in order to match to the time-specified mail-receiving indication.

When a mail-receive indicator 150 receives the mail-receive signal from the host computer 180 through the electronic exchange 140, the indicator 150 decodes the mail-receive signal and flashes the indicating lamp to notify the user of the receipt of the electronic mail.

Figure 9:
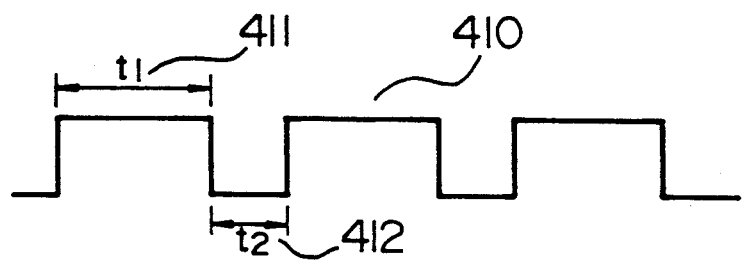
FIG. 9 is an explanatory diagram showing a normal flashing timing.
Figure 10:
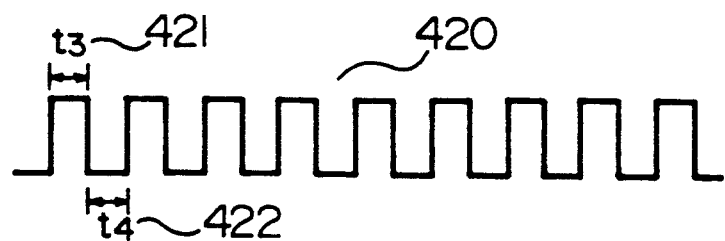
FIG. 10 is an explanatory diagram showing an urgent flashing timing.

FIGS. 9 and 10 show timings on which the lamp is flashed. Pulse peak portions 411 and 421 indicate that the lamp is flashed and pulse valleys 412 and 422 indicate that the lamp is turned off. If the mail-receiving type is normal, as shown in FIG. 9, the flashing period is made longer. If it is urgent, as shown in FIG. 10, the flashing period is made shorter.

As has been understood from the above description, in this embodiment, the mail-receiving indication utilizes the lamp flashing. In place, the characters may be displayed on a LCD or an ICON display window for indicating that the mail is received. As a further embodiment, a pocket bell or pager may be used for giving a mail-receiving beep.

As another embodiment, it is possible to utilize a function of exchanging a voice message in an electronic exchanger. The voice message exchange function is defined as an intelligent digital telephone function which is designed to accumulate a voice message sent from a sending terminal in an exchanger, notify the LCD of the receiving terminal of the receipt of the voice message, and then sending a voice message to the receiving user. The combination of the voice message exchange function and the electronic mailing system may form a system of notifying the user on the receiving or destination terminal of the fact that the electronic mail is received.

Figure 11:
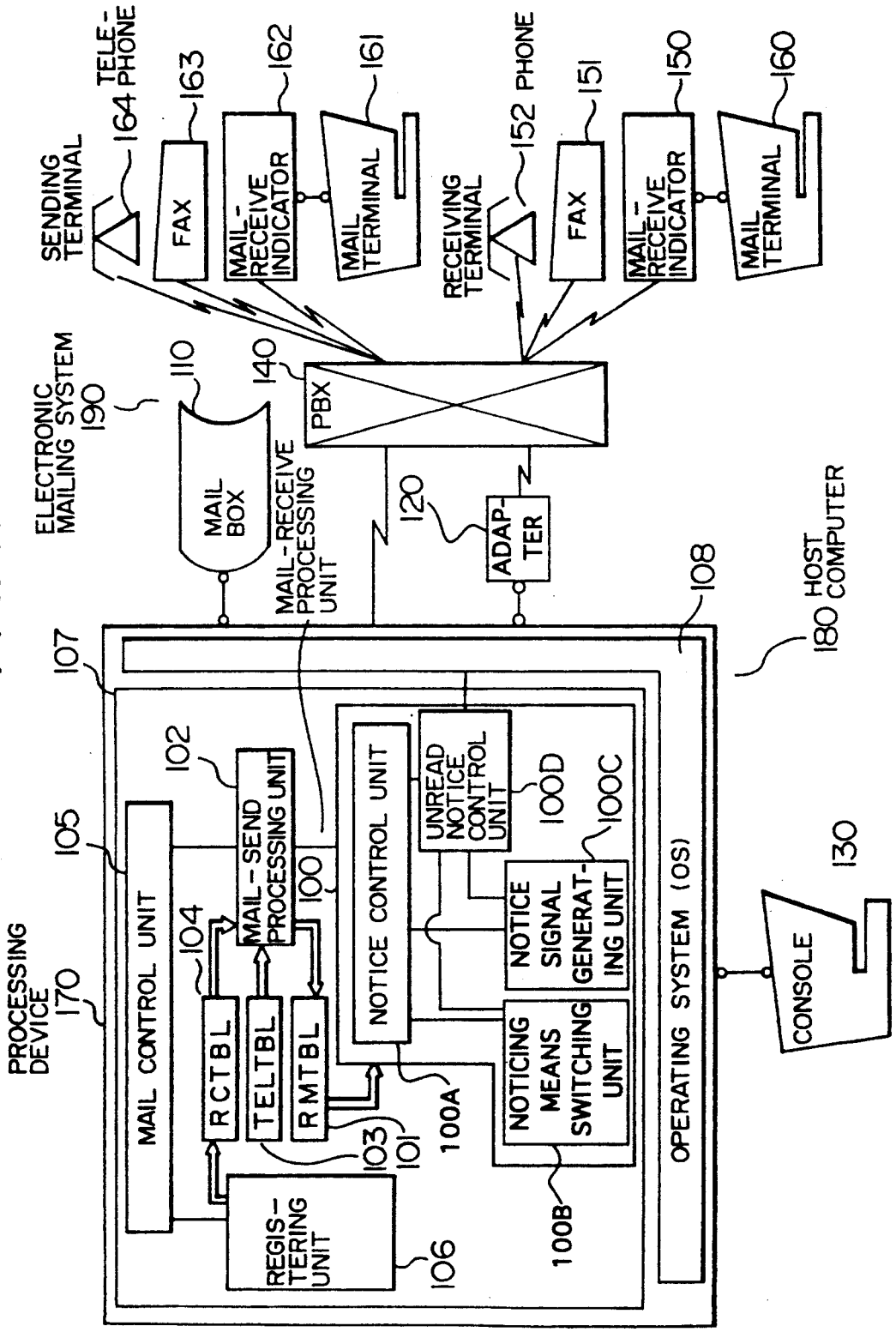
FIG. 11 is a block diagram showing an electronic mailing system according to another embodiment of the present invention.

FIG. 11 is a block diagram showing an electronic mailing system according to another embodiment of the invention.

This embodiment may be regarded as an expansion of the aforementioned embodiment. Hence, the same reference numbers of this embodiment as those of the aforementioned embodiment indicate the same components. The mailing system of this embodiment is arranged to have two or more mail-receive indicating means for making the notice more reliable and to notify the user on a sending terminal of whether or not the user on a receiving terminal acknowledges the mail-receive as a result.

In FIG. 11, a reference numeral 100 denotes a mail-receive processing unit which is configured to include a notice control unit 100A, a switching control unit 108B for a plurality of terminals' noticing means, a notice signal generating unit 100c, and an "unread" notice control unit 100D. On each terminal, a mail-receive noticing means is provided. The noticing means includes mail-receive indicators 150, 162, facsimiles 151, 163 and phones 152, 164. The mail-receive indicators 150, 162 are connected to mail terminals 160, 161, respectively and the facsimiles and the telephones are served as auxiliary noticing means. For simplifying the description, one mail-sending terminal and one mail-receiving terminal are merely illustrated in FIG. 11. Actually, however, it will be easily understood by the persons skilled in the art that the PBX 140 includes a lot of similar mail-receive noticing means connected thereto so that any one of the terminals can broadcast a mail to many terminals.

Then, the description will be directed to the operation of each function section of the mail-receive processing unit 100.

Numeral 100A denotes a notice control unit, which serves to control the control units 100A, 100B and the signal generating unit 100C based on the mail-receiving notice information RMTBL 101 and notify the receiver of the fact that the mail is received. Then, the control unit 100A also serves to operate an "unread" notice control unit 100D for notifying a mail sender of the notice information such as by what means the mail-receive is noticed and whether or not the mail is read by the receiver. The noticing means switching control unit 100B serves to analyze the mail-receiving notice information for determining how urgently the mail-receive is noticed, that is, the type of top urgent, urgent or normal, by what means the mail-receive is noticed, that is, the noticing medium of a mail-receive indicator, a facsimile or a telephone, or a noticing time. The optimal noticing pattern may be selected according to how urgently the mail-receive is noticed. For example, the notice pattern may be variable from just one signal to many a signal until the receiver notices the mail-receive. In the latter case, two or more noticing mediums may be used in combination. The control unit 100B controls the using order of the noticing mediums. The mail-receiving notice information is allowed to be generated so that the mail-sending terminal may select the notice pattern.

The notice signal generating unit 100C is operated under an indication sent from the notice control unit and generates a corresponding signal to each of the notice medium, that is, the telephone, the facsimile, and the mail-receive indicator. Concretely, the unit 100C generates a signal indicating a tone level or a space between rings for the telephone, generates a text of "You have a message from Mr/Mrs/Miss X" or a signal indicating a conversion of the mail to the facsimile signal for outputting the mail from the facsimile, or generate a signal indicating a space between flashings of the lamps or generation of a message. The signal generating unit 100C further controls the adapter 120 so as to put off the notice or set the re-transmitting or retry time.

The "unread" notice control unit 100D serves to retrieve the mail box at regular time intervals and find out whether the mail to be noticed is read. Further, the unit 100D serves to notice to the sender that the mail is not still unread by the receiver. The noticing method uses any one of the noticing mediums for the mail receiver.

The electronic mailing system of the present invention is capable of giving to a user on a receiving terminal a notice that an electronic mail is received in a host computer without needing access to the host computer. From the notice, the user on the receiving terminal can know how urgently the mail is to be read. In addition, the mailing system provides a fail-safe function for a mail-receiving notice for preventing the reading timing of the electronic mail from being lagged.

What is claimed is:

1. An electronic mailing system having at least two terminals and a host computer connected through a communication line, one terminal sending an electronic mail to said host computer, said host computer storing said electronic mail, and the other terminal of a subscriber receiving said electronic mail stored in said host computer, comprising:

said sending terminal including means for generating information designating a type of mail-receiving notice according to a sender's request of how urgently mail-reception is noticed, adding the designating information to an electronic mail to be sent, and sending the added result to said host computer;

said host computer including means for receiving said information designating the type of the mail-receiving notice from said sending terminal and means for generating the mail-receiving notice information based on the received information designating the type mail-receiving notice and means for sending the generated mail-receiving notice to said receiving terminal; and said receiving terminal including means for receiving the mail-receiving notice information from said host computer and means for notifying the user on said receiving terminal of that said electronic mail is received in said host computer according to the received mail-receiving notice information.

2. An electronic mailing system as defined in claim 1, wherein said sending terminal includes means for accepting said mail-receiving notice request and said accepting means permits the user to selectively specify any one of mail-receive noticing methods.

3. An electronic mailing system as defined in claim 2, wherein said means for accepting the mail-receiving notice request permits the user to specify a mail-receive noticing time.

4. In an electronic mailing system having a host computer and a plurality of terminals connected to said host computer, a sending terminal of said terminals sending an electronic mail to said host computer, said host computer storing said electronic mail, and a receiving terminal of said terminals having access to said electronic mail stored in said host computer, said electronic mailing system comprising:

each of said terminals including means for generating a signal indicating a mail-receiving notice pattern depending upon how urgently mail-reception is noticed, means for adding said indicative signal to a sending signal of the electronic mail, and means for sending the added result to said host computer if the terminal is served as a sending one and means for noticing that the electronic mail reaches said host computer based on the mail-receiving notice information received from said host computer if the terminal is served as a sending one; and said host computer including mail-receive processing program means for determining a corresponding main-receiving notice pattern according to how urgently the mail-receive is noticed, based on an indicative signal sent from the terminal served as a sending one and sending the mail-receiving notice information standing for said pattern to a mail destination terminal.

5. An electronic mailing system as claimed in claim 4, wherein said mail-receiving notice pattern has a combination of different noticing means containing a mail-receive indicating lamp, a phone, and a facsimile.

6. An electronic mailing system as claimed in claim 4, wherein said mail-receive processing program means includes between said host computer and each terminal access detecting means for monitoring a mail box provided in said host computer at predetermined time intervals and detecting whether or not the destination terminal has access to the mail to be noticed and means for sending an "unread" notice signal to said mail-receive noticing means of the sending terminal in response to a detection result of said access detecting means indicating no access from the destination terminal, sent from said detecting means.

7. An electronic mailing system as defined in claim 6, further comprising an adapter means provided between said host computer and each of said terminals and dialing a mail-receive indicating signal to a destination terminal and noticing means switching control means provided in said mail-receive processing program and for sending a mail-receive indicating signal to the different mail-receive noticing means in sequence if said access detecting means detects no access to said mail box within a predetermined time passed from the receipt of said mail-receive indicating signal.

8. In an electronic mailing system including a host computer and at least two terminals connected to said host computer through a communication line, a sending one of said terminals serving to send an electronic mail to said host computer, said host computer storing said electronic mail, and a receiving or destinating one of said terminals of a subscriber serving to reading said electronic mail stored in said host computer, a mail-receive noticing method comprising the steps of:

- at said sending terminal, generating mail-receiving notice indicating information according to how urgently the mail-receive is noticed, adding said indicating information to the net information of said electronic mail, and sending the added result to said host computer from said sending terminal;
- at said host computer, receiving said mail-receive indicating information from said sending terminal under the control of a program, and generating mail-receiving notice information based on said received indicating information and sending the generated mail-receiving notice information to said receiving terminal; and
- at said receiving terminal, receiving said mail-receiving notice information from said host computer, and noticing that said electronic mail for a user on said terminal reaches said host computer to a mail-receive noticing means specified by said user, based on the received mail-receiving notice information.

9. A mail-receive noticing method as defined in claim 8, wherein said mail-receiving notice indicating information is generated by the user's selectively specified one of two or more mail-receive noticing methods at said sending terminal.

10. A main-receive noticing method as defined in claim 9, wherein said mail-receiving notice indicating information is generated by the user's selectively specified time at said sending terminal.

* * * * *